United States Patent [19]

Toyota et al.

[11] Patent Number: 4,739,015
[45] Date of Patent: Apr. 19, 1988

[54] PROCESS FOR PRODUCING PROPYLENE BLOCK COPOLYMER

[75] Inventors: Akinori Toyota; Norio Kashiwa, both of Iwakuni; Haruyuki Koda, Ohtake; Matsunao Maeda, Iwakuni, all of Japan

[73] Assignee: Mitsui Petrochemical Industries, Ltd., Tokyo, Japan

[21] Appl. No.: 775,368

[22] Filed: Sep. 12, 1985

[30] Foreign Application Priority Data

Sep. 12, 1984 [JP] Japan ................. 59-189770
Sep. 14, 1984 [JP] Japan ................. 59-191730

[51] Int. Cl.$^4$ .................. C08F 4/28; C08F 297/08
[52] U.S. Cl. ..................... 525/270; 525/247; 525/249; 525/259; 525/261; 525/266; 525/323
[58] Field of Search .................. 525/323, 247, 270

[56] References Cited

U.S. PATENT DOCUMENTS 3,970,719 7/1976 Edmonds ..................... 525/323
4,380,608 4/1983 Hasuo et al. ................. 525/323

FOREIGN PATENT DOCUMENTS 0213012 12/1983 Japan ..................... 525/323

Primary Examiner—Wilbert J. Briggs, Sr.
Attorney, Agent, or Firm—Sherman and Shalloway

[57] ABSTRACT

A process for producing a propylene block copolymer in the presence of a highly stereospecific olefin polymerization catalyst which comprises producing a crystalline polymer or copolymer of propylene in a first stage and random-copolymerizing propylene and another alpha-olefin in a mole ratio of from 10:90 to 90:10 in the presence of the propylene polymer or copolymer in a second stage; wherein in the random copolymerization, 0.0001 to 0.5 mole, per gram atom of aluminum in the catalyst, of an oxygen-containing compound being gaseous in a standard condition or 0.001 to 1 mole, per gram atom of aluminum in the catalyst, of an active hydrogen-containing compound being liquid or solid in a standard condition is fed into the random-copolymerization reaction system.

11 Claims, No Drawings

PROCESS FOR PRODUCING PROPYLENE BLOCK COPOLYMER

This invention relates to an improved process by which a propylene block copolymer having excellent rigidity, impact strength, flowability and low-temperature heat-sealing property can be produced industrially advantageously while circumventing various operational troubles such as the adhesion of the polymer to itself or to the inner wall of the polymerization apparatus.

More specifically, the present invention relates to a process for producing a propylene block copolymer in the presence of a highly stereospecific olefin polymerization catalyst which comprises producing a crystalline polymer or copolymer of propylene in a first stage and random-copolymerizing propylene with another alpha-olefin in a mole ratio of from 10:90 to 90:10 in the presence of the propylene polymer or copolymer in a second stage; wherein in the random copolymerization stage, 0.0001 to 0.5 mole, per gram atom of aluminum in the catalyst, of an oxygen-containing compound being gaseous in a standard condition or 0.001 to 1 mole, per gram atom of aluminum in the catalyst, of an active hydrogen-containing compound being liquid or solid in a standard condition is fed into the random-copolymerization reaction system.

It has been known that a rubbery copolymer of propylene and/or a crystalline polymer or copolymer of another alpha-olefin, above all, a crystalline polymer or copolymer from ethylene as a sole or a major component, is produced in the presence of various types of catalysts for stereoregular polymerization by a first step of producing a crystalline polymer or copolymer of propylene (may sometimes be generically referred to simply as polypropylene hereinafter) and a second step of copolymerizing propylene with another alpha-olefin in the presence of the polypropylene obtained in the first step. Such a multiple-step polymerization method is known to give a composition having improved impact strength at low temperatures while retaining the excellent rigidity of polypropylene.

The above composition is usually an intimate mixture of the polymers or copolymers produced in the individual steps, but is generally called a block copolymer. Such a block copolymer is used, for example, as a material for containers, automotive parts, films easily heat-sealable at low temperatures, and high-impact films.

To improve the impact strength of the above block copolymer further, an effective method is to increase the proportion of a rubbery copolymer formed. This inevitably results in an increased tendency of the polymer particles to adhere to each other. Consequently, the polymer particles frequently adhere to each other or to the inner wall of the apparatus, and make it difficult to perform a stable operation over an extended period of time. Particularly, in vapor-phase polymerization, the adhesion of the polymer particles to each other reduces their flowability, and the reduced flowability becomes a serious operational defect. In slurry polymerization, the adhesion of polymer particles caused by the increased amount of a solvent-soluble polymer increases the viscosity of the slurry becomes, and the polymerization operation becomes difficult. In addition, the amount of the rubbery polymer taken into the solid polymer does not increase as much as is desired. Polymer particles obtained under these unsatisfactory conditions have a low bulk density and poor flowability, and cause many troubles in after-treatment operations such as conveying or melt-processing.

In an attempt to reduce such a tendency of adhesion of polymer particles, Japanese Laid-Open Patent Publications Nos. 151713/1981 and 213012/1983 propose the addition of an alkoxyaluminum compound to the copolymerization system in the stage of copolymerizing propylene with another alpha-olefin during the production of a propylene block copolymer. This method, however, has the defect that the desired results are difficult to achieve unless the alkoxyaluminum compound is added in a considerably large amount for the alkylaluminum compound catalyst component used in the polymerization.

The present inventors have made investigations on the development of a process by which the adhesion of polymer particles to each other and to the inner wall of the apparatus can be reduced while circumventing the need for using a substantial amount of the alkoxyaluminum compound in the prior art mentioned above.

These investigations have led to the unexpected discovery that when a certain regulated amount of an oxygen-containing compound being gaseous in a standard condition (0° C., 1 atm.), such as oxygen (which has heretofore been regarded as a kind of catalyst poison), or an active hydrogen-containing compound being liquid or solid in a standard condition (0° C., 1 atm.), such as methanol or ethanol, is fed into the random-copolymerization reaction system, such a compound produces a marked improving effect in circumventing the aforesaid adhering tendency of polymer particles without a substantial and undesirable reduction in polymerization activity.

The above-cited prior art relating to the addition of the alkoxyaluminum compound shows that the alkoxyaluminum compound can be prepared by mixing an alkylaluminum compound with oxygen or an alcohol in advance. Quite unexpectedly, however, it has now been found that when an oxygen-containing compound being gaseous in a standard condition, such as oxygen, or an active hydrogen-containing compound being liquid or solid in a standard condition, such as an alcohol, is introduced into the random-copolymerization system, it is very effective for eliminating the aforesaid adhering tendency in lesser amounts, based on oxygen or alcohol, than in the case of using the alkoxyaluminum compound prepared in advance. It has also been found that in addition to oxygen, inexpensive and easily available other oxygen-containing compounds being gaseous in a standard condition, such as CO or $CO_2$ can be used, and in addition to alcohols, other inexpensive and easily available active hydrogen-containing compounds can be used.

Thus, the investigations of the present inventors have shown that the defect of the prior art can be overcome, and the aforesaid adhering trouble can be circumvented industrially advantageously, by process for producing a propylene block copolymer in the presence of a highly stereospecific olefin polymerization catalyst which comprises producing a crystalline polymer or copolymer of propylene in a first stage and random-copolymerizing propylene with another alpha-olefin in a mole ratio of from 10:90 to 90:10 in the presence of the propylene polymer or copolymer in a second stage; wherein in the random copolymerization stage, 0.0001 to 0.5 mole, per aluminum atom in the catalyst, of an oxygen-containing compound being gaseous in a standard condition or 0.001 to 1 mole, per aluminum atom in the catalyst, of an active hydrogen-containing compound being liquid or solid in a standard condition is fed into the random-copolymerization reaction system. The aforesaid oxygen-containing compound or active hydrogen-containing compound is easily available at low cost, and can be fed to the random-copolymerization system directly or indirectly.

The details of the mechanism by which the unexpected and excellent improving effect is achieved by the process of this invention have not yet been elucidated. However, in view of Examples and Comparative Examples given hereinafter which show clearly different functional effects achieved, it is presumed that the mechanism by which the unexpected and excellent improving effect achieved by the process of this invention by feeding the aforesaid regulated and small amount of the specific oxygen-containing compound or active hydrogen-containing compounds into the random-copolymerization system is clearly different from the mechanism attributed to the mere conversion of the alkyl aluminum compound into the alkoxyaluminum compound by the action of oxygen or alcohol. Needless to say, it should be understood that the process of this invention is in no way restricted by such a presumption of the mechanism.

It is an object of this invention to provide an improved process for industrially advantageously producing a propylene block copolymer with good operability.

The above and other objects of this invention along with its advantages will become more apparent from the following description.

According to the process of this invention, in the production of a propylene block copolymer in the presence of a highly stereospecific olefin polymerization catalyst by producing a crystalline polymer or copolymer of propylene in a first stage and block-copolymerizing propylene and another alpha-olefin in a weight ratio of from 10:90 to 90:10 in the presence of the polymer or copolymer in a second stage, 0.0001 to 0.5 mole, per gram atom of aluminum in the catalyst, of an oxygen-containing compound being gaseous in a standard condition or 0.001 to 1 mole, per gram atom of aluminum in the catalyst, of an active hydrogen-containing compound being liquid or solid in a standard condition is fed into the random-copolymerization reaction system in the random copolymerization stage.

The catalyst used in this invention is a catalyst capable of catalyzing the high stereoregular polymerization of propylene. Many such catalysts have already been known. Typically, such a catalyst comprises a titanium catalyst component and an organoaluminum compound catalyst component, and optionally an electron donor catalyst component for improved stereoregularity.

A typical example of the titanium catalyst component is a titanium trichloride catalyst component or a magnesium compound-supported halogen-containing titanium catalyst component containing a reaction product of a magnesium compound, a titanium compound and an electron donor as an essential ingredient. Both types of titanium catalyst component can be used in the present invention, but the latter is preferred in view of its markedly high activity.

The titanium trichloride catalyst component may be obtained by reducing titanium tetrachloride with a reducing agent such as aluminum, titanium, hydrogen or an organoaluminum compound, or by activating it by mechanical pulverization treatment such as ball milling and/or a solvent washing treatment (washing treatment with an inert solvent and/or a polar compound such as an ether), treatment with titanium tetrachloride, etc.

The halogen-containing titanium catalyst component containing a reaction product of a magnesium compound, a titanium compound and an electron donor as an essential ingredient can be obtained, for example, by reacting the magnesium compound (or metallic magnesium), the titanium compound and the electron donor in an arbitrary sequence, or reacting the aforesaid materials and a reaction aid such as a halogenating agent and/or an organoaluminum compound in an arbitrary sequence, or by washing the product obtained by each of the above methods with a solvent. This type of catalyst component, in the absence of an inert diluent, has a specific surface area of usually at least 3 m$^2$/g, for example 30 to 1000 m$^2$/g, a halogen/Ti atomic ratio of, for example, from 4 to 100, preferably from 6 to 70, an Mg/Ti atomic ratio of, for example, from 2 to 100, preferably from 4 to 70, and an electron donor/titanium mole ratio of, for example, from 0.2 to 10, preferably from 0.4 to 6. Normally, this catalyst component is much more amorphous than commercial magnesium halides. Typical examples of the electron donor are esters, ethers, acid anhydrides and alkoxysilicon compounds.

As stated above, many methods for producing the titanium catalyst component are known in the art and can be utilized in the present invention.

The titanium catalyst component preferably has narrow particle size distribution and is of a spherical, elliptical or like shape.

Compounds at least having one Al-carbon bond in the molecule can be used as the organoaluminum compound catalyst component for the block copolymerization. Examples include (i) organoaluminum compounds represented by the general formula $R^1_m Al(OR^2)_n H_p X_q$ wherein $R^1$ and $R^2$ are identical or different and each represents a hydrocarbon group having, for example, 1 to 17 carbon atoms, such as an alkyl, aryl, alkenyl or cycloalkyl group, X represents a halogen atom, m is a number represented by $0 < m \leq 3$, n is a number represented by $0 \leq n < 3$, p is a number represented by $0 \leq p < 3$, and q is a number represented by $0 \leq q < 3$ and $m+n+p+q=3$, and (ii) complex alkylated compounds of aluminum and a metal of Group I of the periodic table represented by the general formula $M^1 Al R^1_4$ wherein $M^1$ represents Li, Na, or K and $R^1$ is as defined above.

Examples of the organoaluminum compounds (i) are compounds of the general formula $R^1_m Al(OR^2)_{3-m}$ wherein $R^1$ and $R^2$ are as defined, and m is preferably a number represented by $1.5 \leq m \leq 3$; compounds of the general formula $R^1_m Al X_{3-m}$ wherein $R^1$ and X are as defined above, and m is preferably a number represented by $0 < m < 3$; compounds of the general formula $R^1_m Al H_{3-m}$ wherein $R^1$ is as defined above, and m is preferably a number represented by $2 \leq m < 3$; and compounds of the general formula $R^1_m Al(OR^2)_n X_q$ wherein $R^1$, $R^2$ and X are as defined above, $0 < m \leq 3$, $0 \leq n < 3$, $0 \leq q < 3$, and $m+n+q=3$.

Specific examples of the organoaluminum compounds (i) include trialkyl aluminums such as triethyl aluminum and tributyl aluminum; trialkenyl aluminums such as triisoprenyl aluminum; dialkyl aluminum alkoxides such as diethyl aluminum ethoxide and dibutyl aluminum butoxide; alkyl aluminum sesquialkoxides such as ethyl aluminum sesquiethoxide and butyl aluminum sesquibutoxide; partially alkoxylated alkyl aluminums having the average composition $R_{2.5}{}^1Al(OR^2)_{0.5}$; dialkyl aluminum halides such as diethyl aluminum chloride, dibutyl aluminum chloride and diethyl aluminum bromide; alkyl aluminum sesquihalides such as ethyl aluminum sesquichloride, butyl aluminum sesquichloride and ethyl aluminum sesquibromide; partially halogenated alkyl aluminums such as compounds of the formula $R_{2.5}AlX_{0.5}$; alkyl aluminum halides such as ethyl aluminum dichloride, propyl aluminum dichloride and butyl aluminum bromide; dialkyl aluminum hydrides such as diethyl aluminum hydride and dibutyl aluminum hydride; partially hydrogenated alkyl aluminums such as compounds of the formula $R_{2.5}Al$; alkyl aluminum dihydrides such as ethyl aluminum dihydride and propyl aluminum dihydride; and partially alkoxylated and halogenated alkyl aluminums such as ethyl aluminum ethoxychloride, butyl aluminum butoxychloride and ethyl aluminum ethoxybromide. As compounds similar to (i), organoaluminum compounds having at least two aluminums are bonded through an oxygen or nitrogen atom may be cited. Examples of such compounds are $(C_2H_5)_2AlOAl(C_2H_5)_2$, $(C_4H_9)_2AlOAl(C_4H_9)_2$, and

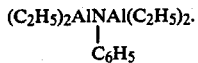

Examples of the compounds (ii) are $LiAl(C_2H_5)_4$ and $LiAl(C_7H_{15})_4$.

Preferred organoaluminum compounds differ depending upon the type of the titanium catalyst component. For example, when the titanium trichloride catalyst component is used, dialkyl aluminum halides are preferred, and when the magnesium compound-supported titanium catalyst component is used, trialkyl aluminums, alkyl aluminum compounds having at least two aluminum atoms, or mixtures thereof with alkyl aluminum halides are preferred.

In addition to the titanium catalyst component and the organoaluminum compound catalyst component, an electron donor catalyst component may be used in the formation of the highly stereospecific olefin polymerization catalyst. Examples of the electron donor catalyst component are organic acid esters, inorganic acid esters, alkoxysilane compounds, carboxylic acid anhydrides, sterically hindered amines, and complexes of these with aluminum chloride.

Examples of the highly stereospecific olefin polymerization catalyst containing the magnesium compound-supported titanium catalyst component are described, for example, in Japanese Laid-Open Patent Publications Nos. 151691/1977, 21093/1978, 135102/1980 to 135103/1980, 811/1981, 63310/1982 to 63312/1982, 83006/1983, and 138705/1983 to 138712/1983. These catalysts can be used in this invention.

In the process of this invention, a crystalline polymer or copolymer of propylene is produced in the first stage. The polymerization in this stage may be carried out in two or more steps. To increase the activity and bulk density of the polymer or to improve its flowability, the catalyst may be subjected to a prepolymerization treatment comprising contacting it with a small amount of propylene prior to the main polymerization. One example of the pre-polymerization treatment is shown, for example, in Japanese Patent Publication No. 45244/1982.

The polymerization in the first stage can be carried out in the liquid or vapor phase in the presence or absence of an inert solvent. The suitable amounts of the catalyst components can be properly selected depending upon the types of the components. For example, in the case of using a typical titanium trichloride catalyst component as the titanium catalyst component, the titanium catalyst component may be used, for example, about 0.01 to about 30 millimoles, preferably about 0.01 to about 10 millimoles, calculated as titanium atom, and the organoaluminum catalyst component is used in such a proportion that the Al/Ti atomic ratio is for example, from about 0.1 to about 50, preferably from about 0.5 to about 10, per liter of the volume of the polymerization zone. In the case of using the highly active titanium catalyst component supported on a magnesium compound, the titanium catalyst component may be used in an amount of about 0.001 to about 0.5 mg-atom, preferably about 0.005 to about 0.5 mg-atom, as the titanium atom, the organoaluminum compound catalyst component may be used in such a proportion that the Al/Ti atomic ratio is from about 1 to about 2,000, preferably from about 1 to about 500, and the electron donor catalyst component may be used in an amount of about 0.001 to about 50 moles, preferably about 0.005 to about 50 moles, per mole of the organoaluminum compound catalyst component properly selected according to its type, per liter of the volume of the polymerization zone.

In the polymerization of the first stage, a crystalline polymer or copolymer of propylene is produced in order to obtain a block copolymer having high rigidity. In the production of the copolymers, alpha-olefins other than propylene may, for example, be used. Examples are alpha-olefins having 2 to 10 carbon atoms such as ethylene, 1-butene, 1-pentene, 1-hexene, 4-methyl-1-pentene, 1-octene and 1-decene. The proportion of the propylene units in the copolymer may conveniently be adjusted to at least about 90 mole%, preferably at least about 95 mole%. Preferably, a highly crystalline propylene polymer or copolymer having a crystallinity, measured by X-rays, of at least 40% is produced in the first stage. Preferably, the polymer or copolymer produced in the first stage has an intrinsic viscosity, measured at 135° C. in decalin, of about 1 to about 15 dl/g, particularly about 1 to about 7 dl/g. To obtain such a polymer, a molecular weight controlling agent, preferably hydrogen, may be caused to be present in the polymerization system.

The polymerization temperature in the first stage may be properly selected, and is, for example, about 40° to about 150° C., preferably about 50° to about 100° C., more preferably about 60° to about 90° C. The polymerization pressure may also be properly selected, and is, for example, about 1 to about 200 kg/cm²-G, preferably about 1 to about 100 kg/cm²-G.

When the polymerization is performed in the liquid phase, propylene may be used as a solvent. Alternatively, an inert solvent may be used. Specific examples of the inert solvent are propane, butane, pentane, hexane, heptane, octane, decane and kerosene.

In the second stage of the process of this invention, propylene and another alpha-olefin in a mole ratio of from 10:90 to 90:10 are random-copolymerized in the presence of the crystalline propylene polymer or copolymer containing the catalyst which is obtained in the first stage. Usually, the random copolymerization is carried out subsequently to the first step of producing the crystalline propylene polymer or copolymer. If desired, after the first stage and before the random copolymerization stage, a step of producing a crystalline polymer or copolymer of another alpha-olefin may be provided. If the step of producing the crystalline polymer of the other alpha-olefin is to be provided, it is preferably provided after the stage of random copolymerization from the standpoint of the process.

The random copolymerization may also be carried out in the liquid phase or in the vapor phase. If the vapor-phase polymerization is employed, all the copolymers produced in random copolymerization stage are taken into the block copolymer, and the yield of the block copolymer based on the consumed olefins is high to industrial advantage.

Examples of the other alpha-olefins used in the random copolymerization include ethylene and $C_4$–$C_{10}$ alpha-olefins such as 1-butene, 1-pentene, 1-hexene, 4-methyl-1-pentene, 1-octene and 1-decene. Preferably, the other alpha-olefin is ethylene or a combination of ethylene with a $C_4$–$C_8$ olefin, especially $C_4$–$C_6$ olefin. The mole ratio of propylene to the other olefin to be copolymerized is from 10:90 to 90:10, preferably from 20:80 to 80:20, more preferably from 30:70 to 70:30.

When an oxygen-containing compound which is gaseous in a standard condition (0° C., 1 atm.) is used in the random copolymerization in the second stage, its amount is 0.0001 to 0.5 mole, preferably 0.0001 to 0.2 mole, more preferably 0.001 to 0.2 mole, per gram atom of aluminum in the catalyst. In the case of using an active hydrogen-containing compound which is liquid or solid in a standard condition (0° C., 1 atm.), its amount is 0.001 to 1 mole, preferably 0.01 to 1 mole, more preferably 0.02 to 0.8 mole, especially preferably 0.02 to 0.6 mole, per gram atom of aluminum in the catalyst.

Examples of the oxygen-containing compound (not containing active hydrogen) are oxygen, carbon monoxide, carbon dioxide, nitrogen monoxide, sulfur dioxide and carbonyl sulfide. The use of oxygen is most effective. They may be used in a combination of two or more, or may be used after dilution with an inert gas such as nitrogen or argon. The oxygen-containing compound should be used in the amount specified above. If its amount exceeds the upper limit specified above, the catalytic activity of the catalyst is reduced too much. In the case of using oxygen, the process should be controlled in an actual operation so as not to form an explosive gaseous mixture.

Examples of the active hydrogen-containing compound (which may further contain oxygen) are water, alcohols, phenols, carboxylic acids, sulfonic acids, primary amines and secondary amines. Specific examples include saturated or unsaturated aliphatic, alicyclic or aromatic alcohols having about 1 to 18 carbon atoms such as methanol, ethanol, isopropanol, n-propanol, tert-butanol, n-hexanol, n-octanol, n-dodecanol, oleyl alcohol, ethylene glycol, propylene glycol, diethylene glycol, methoxyethanol, cyclohexanol, benzyl alcohol, isopropylbenzyl alcohol and phenethyl alcohol; phenols such as phenol, cresol, xylenol, ethylphenol, isopropylphenol, tert-butylphenol and nonylphenol; aliphatic, alicyclic or aromatic carboxylic acids such as lower aliphatic carboxylic acids (e.g., formic acid, acetic acid, propionic acid, butyric acid or acrylic acid), cyclohexanecarboxylic acid, benzoic acid, alicyclic acid and stearic acid; sulfonic acids such as methanesulfonic acid, ethanesulfonic acid, benzenesulfonic acid and toluenesulfonic acid; primary amines such as ethylamine, isopropylamine, cyclohexylamine and aniline; and secondary amines such as dimethylamine, di-n-butylamine, dibenzylamine and piperidine.

The use of alcohols, particularly those having 1 to 10 carbon atoms, is preferred because it produces a great effect. Two or more of these active hydrogen-containing compounds may be used in combination.

In the present invention, the feeding of the oxygen-containing compound into the random copolymerization system may be carried out, for example in accordance with the following embodiments.

(a) Prior to the random copolymerization of propylene with the other alpha-olefin the oxygen-containing compound is added to the crystalline propylene polymer or copolymer containing the catalyst which is to be fed to the random copolymerization system.

For example, in batchwise polymerization, the random copolymerization may be started after the oxygen-containing compound is introduced toward the end of, or after, the first stage of producing the crystalline propylene polymer or copolymer. In continuous polymerization, the oxygen-containing compound may be introduced by providing an intermediate drum between the system in which to produce the crystalline polymer or copolymer of propylene in the first stage and the random-copolymerization system, and introducing the oxygen-containing compound through the drum.

(b) The oxygen-containing compound is directly fed into the random-copolymerization system. In the batchwise polymerization, all the oxygen-containing compound is preferably added in the initial period of polymerization.

If in the continuous polymerization, the random copolymerization is carried out in the vapor phase, the method (b) is preferred because it produces a greater effect than the method (a).

In the method (b), the oxygen-containing compound may be mixed in advance with gaseous materials and the mixture, fed into the polymerization apparatus. For example, it is preferred to introduce the oxygen-containing compound into a pipe for feeding gaseous materials to mix them in advance and then feeding the mixture into the polymerization apparatus. In the case of continuous polymerization in a fluidized bed or the like, it is possible to recycle the unreacted gases and introduce the oxygen-containing compound into a line of the recycle gases.

The active hydrogen-containing compound may be directly introduced into the random-copolymerization system. It is effective however to mix it with an inert gas or gaseous polymerization materials in advance. Alternatively, it may be fed into the random copolymerization system after it is diluted with a solvent such as butane or hexane.

The amounts polymerized in the random copolymerization stage in the process of this invention can be properly varied depending upon the properties of the desired block copolymer. For example, the amount of the monomers is about 5 to about 80 parts by weight, preferably about 5 to about 60 parts by weight, especially preferably about 5 to about 50 parts by weight, per 100 parts by weight of the crystalline propylene polymer or copolymer. Generally, the tendency of the resulting block copolymer to decrease in flowability is small when the amount of the monomers to be copolymerized is small, and the use of the process of this invention is not so great. But as the amount of the monomers copolymerized increases, the advantage of using the process of this invention increases.

Preferably, in the random copolymerization stage, it is preferred to produce a random copolymer having an intrinsic viscosity, measured in decalin at 135° C., of about 1 to about 15 dl/g, preferably about 1 to about 10 dl/g. For this purpose, a molecular weight controlling agent such as hydrogen may be properly used. The intrinsic viscosity of the random copolymer cannot be directly measured, but can be calculated from the intrinsic viscosity of the block copolymer and that of the crystalline propylene (co)polymer assuming that additivity exists.

As stated above, in order to improve the impact strength, rigidity and whitening resistance of the block copolymer in this invention, a step of producing a crystalline polymer (or copolymer) of another alpha-olefin may be provided. Most typically, a step of producing a homopolymer of ethylene or a copolymer of ethylene with a minor proportion, for example up to 5 mole%, of another alpha-olefin may be provided. Such a step is preferably provided after the random copolymerization stage.

The random copolymerization is preferably carried out at a temperature of, for example, about 40° to about 150° C., particularly about 50° to about 100° C., and a pressure of about 1 to about 200 kg/cm$^2$-G, especially about 1 to about 100 kg/cm$^2$-G. To produce the crystalline (co)polymer of the other alpha-olefin, the polymerization is carried out preferably at a temperature of, for example, about 40° to about 150° C., especially about 50° to about 100° C., and a pressure of about 1 to about 200 kg/cm$^2$-G, especially about 1 to about 100 kg/cm$^2$-G.

According to this invention, a block copolymer having excellent rigidity and impact strength can be produced with good operability. In particular, since in the random copolymerization step, the adhesion of polymer particles to each other or to the wall of the polymerization apparatus is markedly reduced or circumvented, the process can be operated for an extended period of time. Furthermore, because the resulting block copolymer has a high bulk density and excellent flowability, the copolymer is easy to transport and has good extrusion characteristics.

The following examples illustrate the present invention more specifically.

The amount and intrinsic viscosity of the rubbery polymer in these examples were measured with respect to a sample obtained by dissolving the polymer in n-decane, cooling it to 23° C., removing the precipitated polymer, and recovering the soluble portion by precipitation from acetone.

The proportion of ethylene in the copolymer was determined by $^{13}$C NMR.

Polymer flowability (seconds) was measured in accordance with ASTM D1755-16.

EXAMPLE 1

Preparation of a Ti catalyst component

Tetraethoxysilane (0.11 mole) was added dropwise at room temperature to 0.1 mole of commercial n-butyl magnesium chloride (in n-butyl ether solvent) in an atmosphere of nitrogen, and the mixture was stirred at 60° C. for 1 hour. The resulting solid was collected by filtration and fully washed with hexane.

The solid was stirred in 30 ml of kerosene, and 0.015 mole of diisobutyl phthalate was added. The mixture was treated at 80° C. for 1 hour. Furthermore, 200 ml of TiCl$_4$ was added, and the mixture was treated at 120° C. for 1 hour. The supernatant was then removed by decantation, and 200 ml of TiCl$_4$ was added. The mixture was treated at 120° C. for 1 hour. The solid formed was hot-filtered and washed fully with hot n-decane and hexane. The resulting titanium catalyst component contained 2.9% by weight of Ti, 62% by weight of Cl, 17.3% by weight of Mg and 11.1% by weight of isobutyl phthalate, and had a particle diameter of 18 microns.

Fully purified hexane (200 ml) was added to a 400 ml reactor. After the inside of the reactor was fully purged with nitrogen, 6 millimoles of triethyl aluminum and 2 mg atoms, as Ti atom, of the Ti catalyst component were added. While maintaining a temperature of 20° C., 9.92 g of propylene was added continuously over 1 hour. After 1 hour, the supernatant was removed by decantation, and the solid portion was washed with fully purified hexane.

Polymerization

A 50-liter autoclave was fully purged with propylene, and then charged with 13.5 kg of propylene, 10 millimoles of triethyl aluminum, 1 millimole of diphenyldimethoxysilane and 0.08 mg atom, calculated as Ti atom, of the Ti catalyst component. Hydrogen (27 liters) was introduced, and then the temperature was elevated. At 80° C., the system was stirred for 1 hour, and liquid propylene was removed over 1 hour. Oxygen was then added in an amount of 0.75 millimole to the polymerization system. A gaseous mixture of ethylene and propylene (in a mole ratio of 40:60) was added at 60° C. and a rate of 308 liters/hour for 3 hours. No adhesion of a tacky polymer to the inside of the autoclave was observed. The amount of the polymer yielded was 6.5 kg. The results of its analysis are shown in Table 1.

EXAMPLE 2

Preparation of a Ti catalyst component

Commercial magnesium chloride (95.3 g), 488 ml of n-decane and 46.45 ml of 2-ethylhexanol were reacted at 130° C. for 2 hours to form a uniform solution. Then, 22.2 g of phthalic anhydride was added. The uniform solution was then added dropwise with stirring over 20 minutes to 4 liters of titanium tetrachoride kept at −20° C. Furthermore, the mixture was stirred at −20° C. for 1 hour. Then, the temperature was gradually elevated. When the temperature reached 110° C., 97.5 g of octyl phthalate was added, and the mixture was stirred at 110° C. for 2 hours. The solid portion was collected by filtration, and suspended in 4 liters of TiCl$_4$. The suspension was stirred at 120° C. for 1 hour. The solid product was collected by filtration, and washed fully with purified hexane until no free titanium compound was detected from the washings. The resulting titanium catalyst component contained 2.9% by weight of Ti, 60.3% by weight of Cl, 22.0% by weight of Mg and 13.06% by weight of dioctyl phthalate and had a particle diameter of 15 microns.

Polymerization

A 50-liter autoclave was fully purged with propylene, and charged with 13.5 kg of propylene, 15 millimoles of tri-n-hexyl aluminum, 2 millimoles of phenyltriethoxysilane and 0.2 millimole of the resulting Ti catalyst component at room temperature. Hydrogen (27 Nl) was added, and the temperature was elevated. These materials were stirred at 70° C. for 1 our. After removing propylene, 0.4 millimole of oxygen was added. A gaseous mixture of 327 Nl of ethylene and 490 Nl of propylene was added at 60° C. over 150 minutes. No adhesion of polymer to the inside of the autoclave was observed, and 6.3 kg of a white powdery polymer was obtained. The results of its analysis are shown in Table 1.

TABLE 1

| Example | 1 | 2 |
|---|---|---|
| Copolymerization Stage | | |
| Oxygen-containing compound | | |
| Type | Oxygen | Oxygen |
| Amount (mmole) | 0.75 | 0.25 |
| Amount polymerized (wt. %)(*) | 28 | 21 |
| Amount yielded (kg) | 6.5 | 6.3 |
| Composition and properties of the polymer | | |
| MFR (g/10 minutes) | 1.1 | 8.3 |
| Ethylene content (wt. %) | 8.8 | 7.5 |
| Apparent density (g/ml) | 0.47 | 0.49 |
| Flowability (seconds) | 7.0 | 8.0 |
| Rubbery polymer | | |
| n-Decane-soluble portion (wt. %) | 12.7 | 9.9 |
| Intrinsic viscosity (dl/g) | 2.7 | 3.3 |
| Falling dart impact strength (kg/cm at −30° C.) | >200 | 140 |
| Izod Impact strength (ASTM D256, −30° C.) | 8.0 | 6.8 |
| Flexural modulus (Kg/cm$^2$) (ASTM D7909 | 12,900 | 14,500 |

(*) Percentage of the amount of polymer formed in the copolymerization stage based on the total amount of polymers formed

EXAMPLES 3-5

Using the Ti catalyst component prepared in Example 1, the same polymerization as in Example 1 was carried out except that the conditions for the copolymerization of ethylene and propylene and the type and amount of the oxygen-containing compound were changed as indicated in Table 2. The results are shown in Table 2.

TABLE 2

| Example | 3 | 4 | 5 |
|---|---|---|---|
| Copolymerization | | | |
| Amount of ethylene/propylene gaseous mixture absorbed (Nl) | 920 | 920 | 920 |
| Time required for absortion of the gaseous mixture (hours) | 6 | 6 | 10 |
| Oxygen-containing compound | | | |
| Kind | Carbon dioxide | Carbon monoxide | Carbonyl sulfide |
| Amount (mmoles) | 0.2 | 0.02 | 0.02 |
| Amount of polymerization (wt. %) | 17.6 | 24.5 | 22.5 |
| Amount yielded (kg) | 6.3 | 6.4 | 6.4 |
| Composition and properties of the polymer | | | |
| MFR (g/10 minutes) | 2.1 | 1.0 | 0.8 |
| Ethylene content (wt. %) | 6.9 | 8.3 | 7.8 |
| Apparent density (g/ml) | 0.46 | 0.43 | 0.45 |
| Falling time (seconds) | 13.6 | 13.4 | 12.9 |
| Rubbery polymer | | | |
| n-Decane-soluble portion (wt. %) | 10.1 | 14.8 | 11.6 |
| Intrinsic viscosity (dl/g) | 3.7 | 3.2 | 3.2 |

COMPARATIVE EXAMPLE 1

Example 1 was repeated except that the copolymerization was carried out without adding oxygen.

The amount of the resulting polymer was 6.7 kg. The polymer had an MFR of 1.8 g/10 minutes, an ethylene content of 8.9% by weight, an apparent density of 0.40 g/ml and a flowability of 42 seconds indicating very poor powder flowability. The proportion of the rubbery polymer (n-decane-soluble portion) was 12.6% by weight, and its intrinsic viscosity was 3.64 dl/g.

COMPARATIVE EXAMPLE 2

Example 1 was repeated except that 1.5 millimoles of diethylaluminum monoethoxide was used instead of 0.75 mmole of oxygen.

The amount of the polymer yielded was 6.6 kg, and the polymer had an MFR of 2.1 g/10 minutes, an ethylene content of 8.3% by weight, an apparent density of 0.36 g/ml, and a flowability of 28 seconds indicating very poor powder flowability. The proportion of the rubbery polymer (n-decane-soluble portion) was 12.0% by weight, and its intrinsic viscosity was 2.81 dl/g.

EXAMPLE 6

Preparation of a Ti catalyst component

A 5-liter reactor was charged with 3 liters of TiCl$_4$, and 150 g of MgCl$_2$.3EtOH (as n-decane suspension) was added at room temperature. Ethyl benzoate (36.8 ml) was added, and the mixture was stirred at room temperature for 1 hour. The temperature was then elevated to 100° C., and the mixture was stirred at 100° C. for 1.5 hours. The supernatant was removed by sedimentation and separation. Three liters of TiCl$_4$ was freshly added, and the mixture was stirred at 110° C. for 2 hours. The supernatant was removed by sedimentation and separation. The supernatant was washed with fresh hexane until no free Ti compound was detected in the hexane.

The resulting solid product contained 3.5% by weight of Ti, 61.0% by weight of Cl, 21.0% by weight of Mg and 10.8% by weight of ethyl benzoate when measured on 1 g of a sample, and had a specific surface area of 230 m$^2$/g, an average particle diameter of 42 microns and a $\sigma_g$ of 1.71. The catalyst was spherical.

Fifty grams of the resulting Ti catalyst was suspended in 2 liters of hexane, and 36.5 millimoles of triethyl aluminum and 12.2 millimoles of methyl toluate were added. Propylene was added so that 150 g of propylene would be polymerized at 25° C.

Polymerization

A 50-liter autoclave was fully purged with propylene, and charged with 13.5 kg of propylene, 20 millimoles of triisobutyl aluminum, 5 millimoles of methyl p-toluate and 0.2 mg-atom, calculated as Ti atom, of the above Ti catalyst component. Hydrogen was added to a pressure of 6 kg/cm$^2$, and the mixture was stirred at 75° C. for 0.5 hour. Liquid propylene was removed over 0.5 hour, and 0.2 millimole of oxygen was added. Furthermore, 1 millimole of triisobutyl aluminum was added and a gaseous mixture of ethylene and propylene in a mole ratio of 50:50 was polymerized for 6 hours at 70° C. until 331.5 liters of the gaseous mixture was absorbed.

The amount of the resulting polymer was 3.2 kg, and it had an apparent density of 0.47 g/ml, an MFR of 2.5 g/10 minutes, a flowability of 8.9 seconds and an ethylene content of 9.5% by weight.

The content of the rubbery polymer was 10.3% by weight, and its intrinsic viscosity was 3.0 dl/g.

EXAMPLE 7

Preparation of a Ti catalyst component

Anhydrous magnesium chloride (7.41 g; 75 millimoles), 37 ml of decane and 35.1 ml (225 millimoles) of 2-ethylhexyl alcohol were reacted at 130° C. for 2 hours to form a uniform solution. Phthalic anhydride (1.11 g; 7.5 millimoles) was added to the solution, and the mixture was stirred at 130° C. for 1 hour to dissolve phthalic anhydride in the uniform solution. The resulting uniform solution was cooled to room temperature, and was entirely added dropwise over 4 hours to 200 ml of titanium tetrachloride kept at −20° C. After the addition, the temperature of the mixture was elevated to 110° C. over 4 hours. When its temperature reached 110° C., 4.0 ml (18.8 millimoles) of diisobutyl phthalate was added, and the mixture was maintained at the same temperature for 2 hours with stirring. After this reaction, the solid portion was collected by hot filtration and suspended in 275 ml of $TiCl_4$. The suspension was reacted at 110° C. for 2 hours. After the reaction, the solid portion was collected by hot filtration and washed fully with decane and hexane at 110° C. until no free titanium compound was detected in the washings. The titanium catalyst component so prepared was stored as a hexane slurry. A part of it, however, was dried for the purpose of examining its composition. The resulting titanium catalyst component contained 2.7% by weight of titanium, 63.0% by weight of chlorine, 17.0% by weight of magnesium and 14.5% by weight of diisobutyl phthalate.

The titanium catalyst component was a granular catalyst component having an average particle diameter of 15.1 microns and the geometric standard deviation ($\sigma_g$) of its particle size distribution was 1.2

Pre-polymerization using alpha-olefin

To 150 ml of fully purified hexane were added 0.96 millimole of triethyl aluminum and 0.32 mg-atom, calculated as titanium atom, of the titanium-containing catalyst component.

Propylene (1.70 g) was fed into the system at 20° C. over 60 minutes. The supernatant was fully replaced by fresh hexane to obtain a titanium catalyst component.

Polymerization

A 50-liter autoclave was fully purged with propylene, and charged with 13.5 kg of propylene, 16 millimoles of triethyl aluminum, 2.1 millimoles of diphenyldimethoxysilane and 0.08 mg, calculated as Ti atom, of the above Ti catalyst component. Hydrogen (26 Nl) was added, and the mixture was stirred at 70° C. for 1 hour. Liquid propylene was removed over 1 hour, and 1.6 millimoles of ethanol was added at 60° C. Immediately then, a gaseous mixture of ethylene and propylene in a mole ratio of 40:60 was fed into the autoclave and polymerized under 3 $kg/cm^2$-G until the amount of polymerization in the copolymerization stage became 18.8% by weight.

The amount of polymerization in the copolymerization system, as used herein, denotes the percent by weight of the amount of the polymer formed in the copolymerization stage based on the total amount of the polymer formed.

There was obtained 6.4 kg of a block copolymer. The copolymer had an MFR of 1.0 g/10 minutes, a bulk density of 0.48 g/ml, an ethylene content of 7% by weight, and a flowability of 7.0 seconds. The proportion of the rubbery polymer as an n-decane-soluble portion was 12.5% by weight, and its intrinsic viscosity was 3.50 dl/g.

EXAMPLES 8-10

Example 7 was repeated except that the conditions in the copolymerization stage were changed as indicated in Table 3. The results are shown in Table 3.

TABLE 3

| Example | 8 | 9 | 10 |
|---|---|---|---|
| [Copolymerization stage] | | | |
| Pressure ($kg/cm^2$-G) | 4 | 5 | 3 |
| Amount of polymerization (wt. %) | 24.6 | 24.0 | 20.8 |
| Active hydrogen compound | | | |
| Kind | Water | Acetic acid | Methanol |
| Amount (mmole) | 5.2 | 1.6 | 4.0 |
| [Results] | | | |
| Amount yielded (kg) | 6.6 | 6.5 | 6.5 |
| MFR (g/10 minutes) | 0.8 | 1.3 | 1.6 |
| Bulk density (g/ml) | 0.45 | 0.45 | 0.48 |
| Ethylene content (wt. %) | 9 | 8.7 | 7.6 |
| Flowability (seconds) | 11.4 | 11.7 | 6.9 |
| Rubbery polymer | | | |
| n-Decane-soluble portion (wt. %) | 13.6 | 13.0 | 11.7 |
| Intrinsic viscosity (dl/g) | 4.12 | 2.74 | 3.05 |

COMPARATIVE EXAMPLE 3

Example 7 was repeated except that ethanol was not added.

There was obtained 6.5 kg of a block copolymer. The block copolymer had an MFR of 1.7 g/10 minutes, a bulk density of 0.38 g/ml, an ethylene content of 6.5% by weight, and a flowability of 36 seconds. The proportion of the rubbery polymer as an n-decane-soluble portion was 11.2% by weight, and its intrinsic viscosity was 2.90 dl/g.

COMPARATIVE EXAMPLE 4

Example 7 was repeated except that 1.6 millimoles of diethyl aluminum ethoxide was used instead of 1.6 millimoles of ethanol. The resulting copolymer had an MFR of 1.6 g/10 minutes, an ethylene content of 8% by weight and a flowability of 18 seconds. The proportion of the rubbery polymer was 12.6% by weight, and its intrinsic viscosity was 3.00 dl/g.

EXAMPLE 11

Preparation of a Ti catalyst component

Commercial magnesium dichloride (95.3 g), 488 ml of n-decane and 464.5 ml of 2-ethylhexanol were heated at 130° C. for 2 hours to form a uniform solution. Then, 22.88 ml of ethyl benzoate was added. The uniform solution was added dropwise with stirring to 4 liters of titanium tetrachloride kept at −20° C. The mixture was further stirred at −20° C. for 1 hour. The temperature was elevated gradually to 80° C., and then 48.6 ml of ethyl benzoate was further added. The mixture was stirred at 80° C. for 2 hours. The solid substance was collected by filtration, and suspended in 4 liters of titanium tetrachloride. The suspesion was stirred for 2 hours at 90° C. The solid substance was collected by filtration, and washed fully with purified hexane until no free titanium compound was detected in the washings. The resulting titanium component contained 3.6% by weight of titanium, 59.0% by weight of chlorine, 17.0% by weight of magnesium and 15.0% by weight of ethyl benzoate, and had a specific surface area of 230 m²/g, an average particle diameter of 13 microns and a $\sigma_g$ of 1.13.

One hundred grams of the Ti catalyst component was suspended in 14 liters of hexane, and 75.16 millimoles of triethyl aluminum and 25.05 millimoles of methyl p-toluate were added. Propylene was added so that 300 g of propylene was polymerized at 25° C.

Polymerization

A 50-liter autoclave was fully purged with propylene, and charged with 13.5 kg of propylene, 15 millimoles of tri-n-hexylaluminum, 4.29 millimoles of methyl p-toluate and 0.15 mg-atom, calculated as Ti atom, of the Ti catalyst component. Hydrogen was added to a pressure of 5 kg/cm², and then the mixture was stirred at 75° C. for 1 hour. Liquid propylene was removed over 1 hour, and 1.29 millimoles of tri-n-hexyl aluminum was added. Then, 0.3 millimoles of ethanol was added, and immediately then, a gaseous mixture of ethylene and propylene in a mole ratio of 50:50 was fed, and polymerized at 70° C. while maintaining a pressure of 4 kg/cm²-G until the amount of polymerization in the copolymerization stage reached 20.6% by weight.

The amount of the polymer yielded was 3.6 kg. The polymer had an MFR of 2.5 g/10 minutes, a bulk density of 0.44 g/ml, and ethylene content of 7.5% by weight and a flowability of 8.4 seconds. The proportion of the rubbery polymer as an n-decane-soluble portion was 11.7% by weight.

What is claimed is:

1. A process for producing a propylene block copolymer in the presence of a highly stereospecific olefin polymerization catalyst wherein the olefin polymerization catalyst is a catalyst comprising a halogen-containing titanium catalyst component and an organoaluminum compound catalyst component, which comprises producing crystalline polymer or copolymer of propylene in a first stage and random-copolymerizing propylene and another alpha-olefin in a mole ratio of from 10:90 to 90:10 in the presence of the propylene polymer or copolymer in a second stage; wherein in the random copolymerization, 0.0001 to 0.5 mole, per gram atom of aluminum in the catalyst, of an oxygen-containing compound being gaseous in a standard condition is fed into a random-copolymerization reaction system.

2. The process of claim 1 wherein the oxygen-containing compound is selected from the group consisting of oxygen, carbon monoxide, carbon dioxide, nitrogen monoxide, sulfur dioxide and carbonyl sulfide.

3. The process of claim 1 wherein the first stage is carried out at a temperature of about 40° to about 150° C. and a pressure of about 1 to about 200 kg/cm²-G, and the second stage is carried out at a temperature of about 40° to about 160° C. and a pressure of about 1 to about 200 kg/cm²-G.

4. The process of claim 1 wherein the other alpha-olefin is selected from the group consisting of ethylene and alpha-olefins having 4 to 10 carbon atoms.

5. The process of claim 1 wherein the mole ratio of propylene to the other alpha-olefin is from 20:80 to 80:20.

6. The process of claim 1 wherein the oxygen-containing compound is selected from the group consisting of oxygen, carbon monoxide, carbon dioxide and carbonyl sulfide.

7. The process of claim 1 wherein from 0.001 to 0.2 mole, per gram atom of aluminum in the catalyst, of the oxygen-containing compound which is gaseous in the standard condition is fed into the random-copolymerization reaction system.

8. The process of claim 1 wherein the oxygen-containing compound is oxygen.

9. The process of claim 1 wherein the oxygen-containing compound is added to the crystalline propylene polymer or copolymer containing the polymerization catalyst from the first stage prior to initiation of the random-copolymerization.

10. The process of claim 1 which is a continuous polymerization process wherein the random-copolymerization in the second stage is carried out in the vapor phase and the oxygen-containing compound is continuously fed into the random-copolymerization reaction system.

11. The process of claim 1 wherein the other alpha-olefin is ethylene or an alpha-olefin having 4 to 10 carbon atoms and the mole ratio of propylene to the other alpha-olefin is from 20:80 to 80:20.

* * * * *